(12) United States Patent
Narang et al.

(10) Patent No.: US 6,874,001 B2
(45) Date of Patent: Mar. 29, 2005

(54) METHOD OF MAINTAINING DATA CONSISTENCY IN A LOOSE TRANSACTION MODEL

(75) Inventors: Inderpal Singh Narang, Saratoga, CA (US); Karen Wolfe Brannon, Palo Alto, CA (US); Suparna Bhattacharya, Karnataka (IN); Hui-I Hsiao, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 09/971,755

(22) Filed: Oct. 5, 2001

(65) Prior Publication Data

US 2003/0069902 A1 Apr. 10, 2003

(51) Int. Cl.[7] ............................................. G06F 17/30
(52) U.S. Cl. ............................. 707/203; 707/8; 707/10
(58) Field of Search .................... 707/1–10, 100–104.1, 707/200–206; 709/213, 214; 717/170

(56) References Cited

U.S. PATENT DOCUMENTS

| | | | | |
|---|---|---|---|---|
| 5,499,365 A | * | 3/1996 | Anderson et al. | 707/203 |
| 6,029,160 A | | 2/2000 | Cabrera et al. | |
| 6,088,694 A | * | 7/2000 | Burns et al. | 707/8 |
| 6,205,445 B1 | * | 3/2001 | Tokuyama | 707/10 |
| 6,564,215 B1 | * | 5/2003 | Hsiao et al. | 707/8 |
| 6,581,075 B1 | * | 6/2003 | Guturu et al. | 707/201 |

OTHER PUBLICATIONS

"Filter File System Implementation of Distributed File Systems", U.S. Appl. No. 09/571,778, IBM, filed May 16, 2000), 30 pages.
ISO/IEC 9075–9:2000(E), "Information Technology—Database Languages SL—Part 9: Management of External Data (SQL/MED)".

* cited by examiner

*Primary Examiner*—Shahid Alam
*Assistant Examiner*—Jean Bolte Fleurantin
(74) *Attorney, Agent, or Firm*—William H. Steinberg; Karuna Ojanen

(57) ABSTRACT

A method, an apparatus, a system, a computer program product, and a computer program are disclosed for maintaining consistency of object content (252) and metadata (204) related to the object (252) in a loose transaction model, preferably using SQL Mediated Object Manipulation (SMOM), for object and meta-data updates. The related meta-data (204) and a reference to the object (252) are stored in a table of a database. The object is stored externally to the database in an object store. The reference is used to obtain a handle for directly accessing or manipulating the external object. A version number embedded in the handle is then obtained. The embedded version number is then compared with a version number of a latest committed version of the externally stored object to determine if the handle refers to a current version of the externally stored object. Next, the last modification timestamp of the file is compared with the last modification timestamp of the latest committed version, in order to detect uncommitted updates. A mismatch indicates that stale data is being referenced, and in that situation an appropriate error is returned.

47 Claims, 11 Drawing Sheets

METHOD OF MAINTAINING DATA CONSISTENCY IN A LOOSE TRANSACTION MODEL

FIELD OF THE INVENTION

The present invention relates generally to electronic information technology and more particularly to electronic data management systems.

BACKGROUND

Content management systems store, access, and manage digital information or content in networked environments, including such information generated in e-business applications. Well integrated content has many applications, and for example, can accelerate business process automation across an enterprise for various sized e-businesses. Relevant content can include electronic documents, text files, XML and HTML files, digital audio and video files, scanned images, facsimiles, and the like.

Content management systems, especially those designed for managing distributed content, may also store meta-data describing an object or related information in a store that is separate from a file containing the object's content. DB2 Universal Database (UDB) is an example of a scalable database that can be used in content management systems as a database management system (DBMS). The DBMS is an essential part of the system for storing digital information or content. Meta-data can be stored in a repository of the DBMS. Examples of meta-data include information about data sources, access authorization, archive and backup histories, data accesses and content identification labels (e.g., video, audio, text).

A particular challenge arising in content management systems is maintaining consistency between file content and the associated meta-data from the point of view of an application accessing the content and meta-data (simply referred to hereinafter as a reader). If file and meta-data updates are tightly coupled (i.e. both updates happen within a single unified transaction), a transaction coordinator typically ensures a consistent view by locking out readers of meta-data as well as file data until the transaction is committed. Intermediate/uncommitted updates to either are not visible. However, this approach has a number of disadvantages including the circumstance that content edits can require considerable amounts of time. This approach also does not allow the convenience of directly accessing and updating the file content on the native filesystem, using native filesystem operations.

On the other hand, in systems where a loose transaction model is provided, and direct content edits are allowed, consistency between file-data and meta-data may not be guaranteed at all times.

A need therefore clearly exists for an improved technique for providing a consistent view of file data and meta-data in the presence of a loose-transaction model.

Management of External Data Using DATALINKS

Content can be referenced within a database using the DATALINK data type, which is part of the ANSI ISO standard described in document ISO/IEC 9075–9:2000(E), "Information Technology—Database Languages SQL—Part 9: Management of External Data (SQL/MED)".

Datalinks (DL) is a mechanism that can be used with DB2 UDB, facilitating management of files residing outside of a database as though the files are logically within the database. Datalinks ensures referential integrity of the external files, provides access control for the files, and supports automatic and coordinated backup and restore capabilities. In this manner, a coordinated administration point is provided for file and database data. In the following description, a DATALINK type is referred to for SQL management of external data.

Datalinks maintains a reference to a file residing in a file system in a column of a DB2 table. The reference is stored as DATALINK data type, which uses a Uniform Resource Locator (URL). A table in the database may have one or more DATALINK columns. The database may also store meta-data about the files with DATALINK references in the same table or other tables. Thus, a row may contain a DATALINK reference and meta-data related to the external file. An SQL query or statement issued by an application or reader may be applied against the table on the meta-data, for example, to locate the (external) file of interest. The URL retrieved from the DATALINK column of the row is then used to access the external file via the native API of the file system or browser.

FIG. 1 illustrates the syntax of the DATALINK data type, including options with respect to write permission, namely FS and Blocked. A DATALINK value references a file that is not part of the SQL environment. The file is assumed to be managed by an external file manager. A DATALINK value is represented by a file reference, which is a character string referencing an external file, and is input and retrieved by invoking a built-in scalar function. A file is linked to the SQL environment when a SQL insert statement causes a value that references the file to appear in a datalink column whose descriptor includes the link control FILE LINK CONTROL. If the read permission option is DB, access to the referenced data source is SQL mediated. If the read permission option is not DB, access to the referenced file is determined by the file system and file manager. NO LINK CONTROL does not cause any file to be linked to the SQL environment.

Further information regarding the datalink structure shown in FIG. 1 can be found in Section 4.8 "Datalinks" at pages 31–35 in the ANSI ISO standard of ISO/IEC 9075–9:2000(E), "Information Technology—Database Languages SQL—Part 9: Management of External Data (SQL/MED)".

DataLinks supports two modes of "WRITE PERMISSION":FS (File System) or BLOCKED. In the FS case, users are allowed to update a file while the file is linked to the database (i.e. the database has a DATALINK value which is currently pointing to the file). However, this mode does not provide file data recovery, which means if the disk crashes or a user needs to restore the database, there is no file backup data to recover from. This could cause inconsistency between the file data and the database data after RESTORE/ROLLFORWORD to a point in time other than the time of the crash. Moreover, WRITE PERMISSION FS does not support the SQL mediated access model like the one provided in READ PERMISSION DB.

On the other hand, WRITE PERMISSION BLOCKED provides data recovery for a file with a reference in a DATALINK column. However, a user cannot update the file while the file is currently linked. In order to modify the file, the user has to unlink the file in one transaction, modify the content and link the file in another transaction. So between the two transactions, the file is not linked, which means it is not under the control of the database (DataLinks) and the file reference is not visible in the database.

FIG. 4 is a block diagram of a system 100 for managing links between a database 80 and external data files 20 referenced in the database 80. The example chosen for illustrative purposes is an employee records database, such as might be utilized by a corporation. The database 80 records reside within a DBMS 50. The external data files 20 are located in a native file system 75 and not in the database 80. An example of the file system 75 is JFS on AIX™, or NTFS on Windows NT™ products.

The database 80 stores an employee table 82 including a name column 83, a department column 84, and a picture column 81. The name column 83 typically contains a string, the department column an integer, while the picture column would contain a reference to an image stored in one of a number of external data files 20. The external data file 20 may also contain other forms of data, including documents, presentations, engineering drawings, spreadsheets, or video clips.

It would be undesirable for any one of the external data files 20 to get deleted, modified, or renamed while that external data file 20 continues to be referenced by the database 80, and in particular the picture column 81. A Datalinks File Manager (DLFM) 60 is therefore provided for maintaining a table (not illustrated) of linked file references. The DLFM 60 may also be responsible for controlling access permission and ownership of the external data files 20. The table maintained by the DLFM 60 contains attributes and subsets of the data stored in the external data files 20, along with logical references to the location of the external data files 20.

In operation, an application program 30 searches the database 80 via a SQL Application Programming Interface (API) request 40 to identify database entries 80 of interest. In the example illustrated in FIG. 4, this typically occurs when an employee record is viewed and there is a requirement for the image of the employee to be displayed with his/her other information.

The DBMS 50 is responsible for managing the links between the database 80 and the data files 20 and provides to the application 30 references to the selected external data files 20 via a handle. An example of the DBMS 50 is the DB2™ Universal Database product of International Business Machines Corporation. The application 30 can now access the external data file 20 directly using standard file-system API calls 70. Typical file-system API calls 70 are "file-open", "file-read" and "file-delete".

A Datalinks File System Filter DLFF 10 is a thin, database control layer or filter on the file system 75. The DLFF 10 intercepts certain of the file-system API calls 70 issued by the application 30. The file-system API calls 70 that are intercepted include file-open, file-rename, and file-delete calls. If the external data file 20 is referenced in the database 80, the DLFF 10 is responsible for enforcing referential-integrity constraints and access-control requirements defined for the data file 20. The referential integrity constraints ensure that the reference to data files 20 remains valid as long as it is "linked" to the database 80. DLFF 10 also ensures that any access call 70 meets Database Management System (DBMS) 50 access control requirements. An example of SQL mediated access is in the use of an authorization token, which is generated by the DBMS as part of the handle and verified by DLFF.

The DLFF 10 validates any authorization token (not illustrated) embedded in the file pathname for a 'file-open' operation. For example, when a user of application 30 submits a SQL API Request 40 to retrieve the employee picture (image) from the database 80, the DBMS 50 checks to see if the user has permission to access the employee table 82 containing the picture column 81. The permission may include select and view privileges on the employee table 82. The DBMS 50 returns the file name of the external file 20 to the application 30 only if the user has the required permission. An authorization token is embedded in the file name as part of the value returned for the picture column 81 by the DBMS 50. The application 30 then uses the file API call 70 to retrieve the image from the external file 20. When the DLFF 10 intercepts the file-open request, the DLFF 10 validates the authorization token to determine whether or not to pass the file-open request through to the native file system 75. If the validation fails, the file-open request is rejected. Once access has been authorized by a valid token, the application 30 interacts directly with the file system 75 for delivery of the external file 20 without the need for the DLFF 10 to further control the file access. This allows the application 30 the same speed of access as to a native file system.

SUMMARY

In accordance with a first aspect of the invention, there is provided a method of maintaining consistency of content of an object and meta-data related to the object in a loose transaction model for object and meta-data updates. The method includes the steps of storing the related meta-data and a reference to the object in a table of a database, the object being stored externally to the database in an object store, the reference used to obtain a handle for directly accessing or manipulating the external object; obtaining a version number embedded in the handle and comparing the embedded version number with a version number of a latest committed version of the externally stored object to determine if the handle refers to a current version of the externally stored object.

Preferably the method further includes the steps of, if the encoded version number and the version number of the latest committed version match, comparing a last modification time stamp of the object with a last modification time stamp for the latest committed version of the object; and if the last modification time stamp of the object matches with the last modification time stamp for the latest committed version of the object, permitting access to the externally stored object. The method may further include the step of, if the last modification time stamp of the object does not match with the last modification time stamp for the latest committed version of the object, generating an error to indicate that the handle refers to stale content in the object.

Preferably the method further includes the steps of updating the object in-place under either DBMS control or file system control and linking the meta-data and the object under DBMS control.

Preferably the method further includes wherein the loose-transaction update model uses SQL Mediated Object Manipulation (SMOM) for an object that resides external to the database.

Preferably the method further includes the step of intercepting a native access to the externally stored object or a file system and validating the caller's access rights based on a combination of the version number and a last modification time stamp for a version of the object. The method may further include the intercepting step being carried out using a filter layer of the object store for the stored object.

Optionally, the object store is a local file system, or a distributed file system, the object being accessed from a remote file system client. A file access which occurs in the presence of authoritative caching and the comparing steps may be performed at the file system client. The method may further include the steps of caching the last known version number and the corresponding last modification time stamp at the file system client after an access and refreshing the last known version number and the corresponding last modification time stamp with latest values from a file server the next time one or both of the comparisons fail with the previously cached values, in which case the comparing steps are retried with refreshed values.

Preferably the method further includes the object which is a file.

Preferably the method further includes the version number associated with the object is embedded in an access token.

Preferably the method further includes the version number is temporally unique.

Preferably the method further includes the last-modification-time stamp attribute associated with the object is maintained by the object store.

In further aspects of the invention, an apparatus, a computer program, a computer program product, and a system for maintaining meta-data and file-data consistency in a loose transaction model of object and meta-data updates are provided.

BRIEF DESCRIPTION OF THE DRAWINGS

A small number of embodiments of the invention are described hereinafter with reference to the drawings, in which:

FIG. 4 is a block diagram of the Datalinks architecture showing where a Datalinks file-system filter (DLFF) fits in;

DETAILED DESCRIPTION

A method, an apparatus, a computer program, a computer program product and a system for maintaining (or ensuring) meta-data and object-data consistency in a loose transaction model of object and meta-data updates, from the perspective of a reader application, are described hereinafter. Preferably, the object may be a file and an object store may be a file system. In the following description, numerous details are set forth. It will be apparent to one skilled in the art, however, that the present invention may be practised without these specific details. In other instances, well-known features are not described in detail so as not to obscure the present invention.

Figure 1:
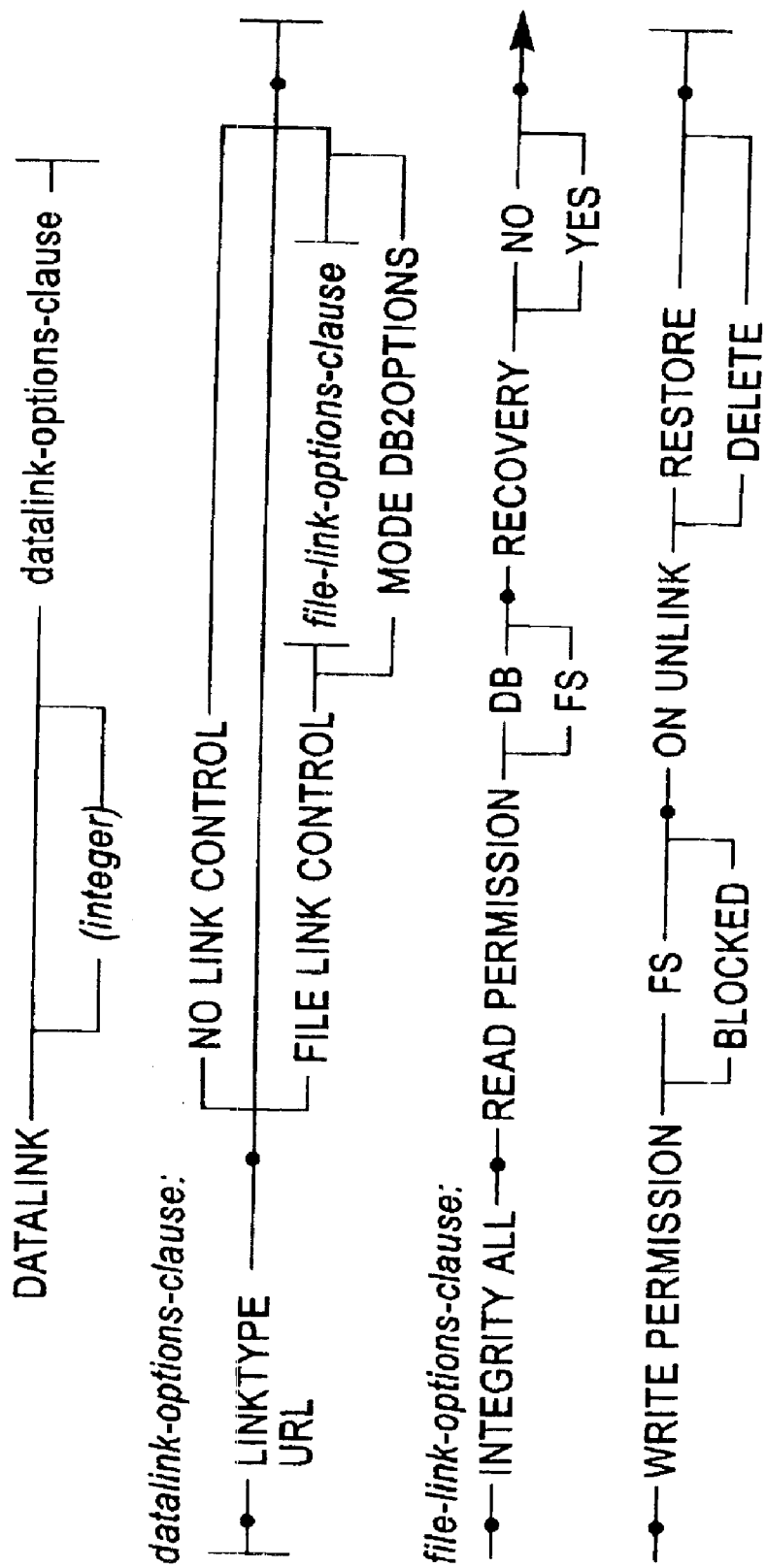
FIG. 1 illustrates the syntax for a DATALINK data type when defining an SQL table.

With the embodiments of the invention, allowing file content to be accessed and updated in-place by directly accessing the file system natively is more convenient. Besides, since content edits can be relatively long running, a loose transaction model for file and meta-data updates is useful where the file can be edited independently of the meta-data. A user can update a file while it is currently linked. In addition, the meta-data for that file can be accessed by other users while the file is in the process of being updated. The meta-data is always visible, even while the file is being update. However, access to the file may be denied. SQL mediated access can be extended to allow update-in-place. Specifically, the WRITE PERMISSION clause in FIG. 1 can be extended to achieve this.

The embodiments of the invention address the noted problem in the context of meta-data maintained in a database table associated with an external file reference to content that is stored in a file system or an object store external to the database.

Generally, a file update takes longer than meta-data updates or typical database transactions. In a typical update, access to the file is requested and the file is locked. The content of the file is modified as well as corresponding meta-data generated. The file is then unlocked (i.e., the file update is declared to be completed) and the meta-data is imported into the database. Changes to the content of the file happen outside a regular DB2 transaction.

In particular, the problem addressed by the embodiments of the invention is ensuring that a reader application always gets a consistent view of the content of a file and the meta-data related to the file, given a loose transaction model for file and meta-data updates. An error can acceptably be returned in situations where the file data being accessed is not consistent with the corresponding meta-data seen by the reader.

Solutions are provided by the embodiments of the invention, firstly for files accessed from a local file system 700. This is then extended to a distributed file system environment 800 for files accessed from remote file system clients in the presence of authoritative caching.

Figure 6:
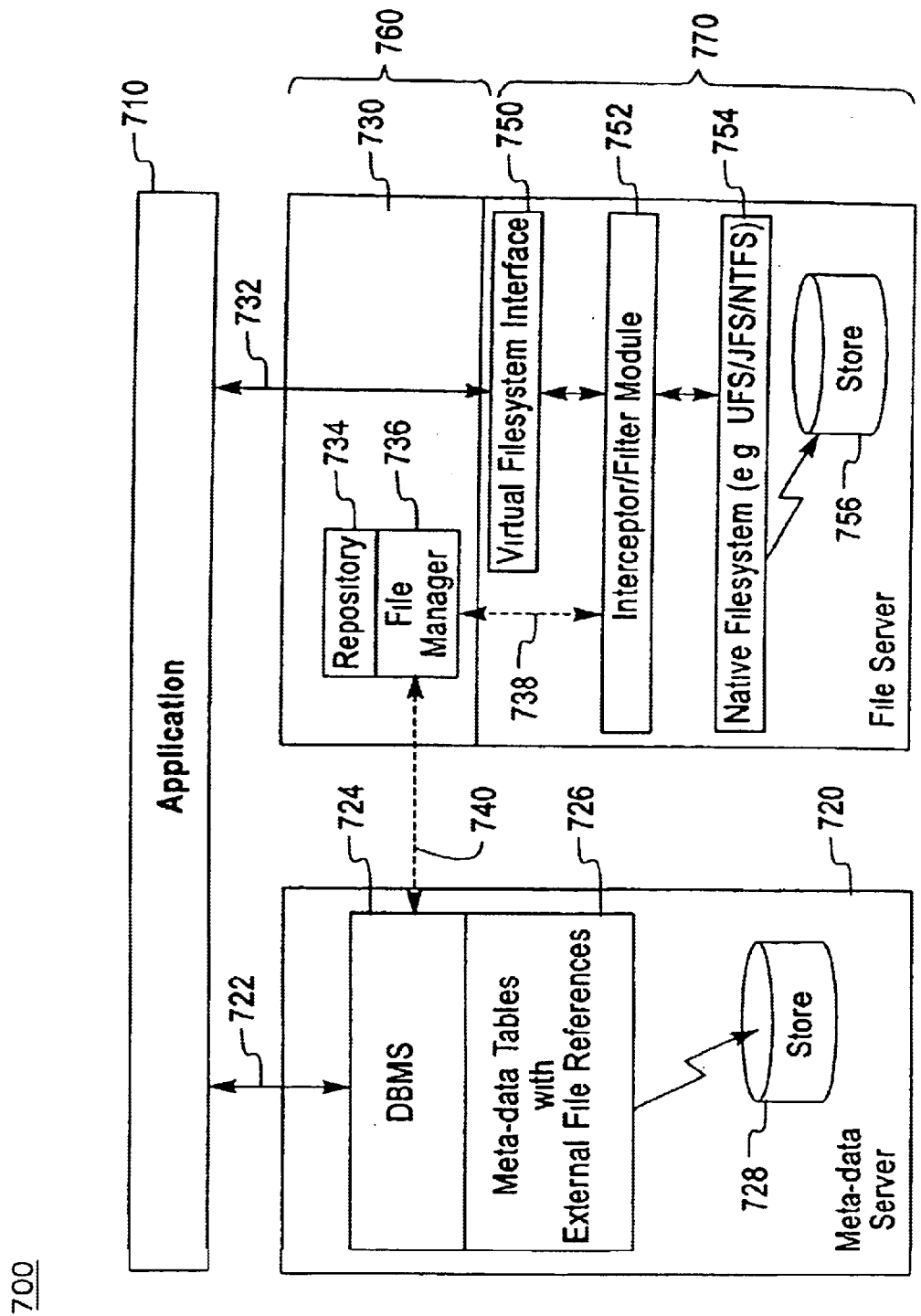
FIG. 6 is a block diagram of the system architecture for a local file system in accordance with one embodiment of the invention.

FIG. 6 is a block diagram of a system 700 for use with a local file system in accordance with a first embodiment of the invention. An application 710 has a SQL path 722 for meta-data access to a meta-data server 720 and a file system API 732 for direct file access to a file server 730. The meta-data server 720 has a database management system (DBMS) 724, which directly interfaces with the SQL path 722. The DBMS 724 also has meta-tables 726 with external file references. The DBMS 724 and Meta-data tables are coupled to a store 728 for storing meta-data. The file server 730 has two modes: user 760 and kernel 770. The user mode 760 includes a local repository 734 and a file manager daemon 736. A control path 740 extends between the DBMS 724 of the meta-data server 720 and the file manager daemon 736 of the file server 730. The control path 740 is indicated by a double headed dashed arrow. The kernel mode 770 includes a virtual file system interface 750, which is bi-directionally coupled to the application 710 via the file system API 732. In turn, the virtual file system interface 750 is bi-directionally coupled with an interceptor/filter module 752. An upcall path 738 also bi-directionally extends between the file manager daemon 736 and the interceptor/filter module 752. The interceptor/filter module is bi-directionally coupled to the native file system 754 (e.g. UFS, JFS, NTS). The native file system 754 is in turn coupled to a store 756 of the file server 760 for storing one or more relevant objects or files.

Figure 7:
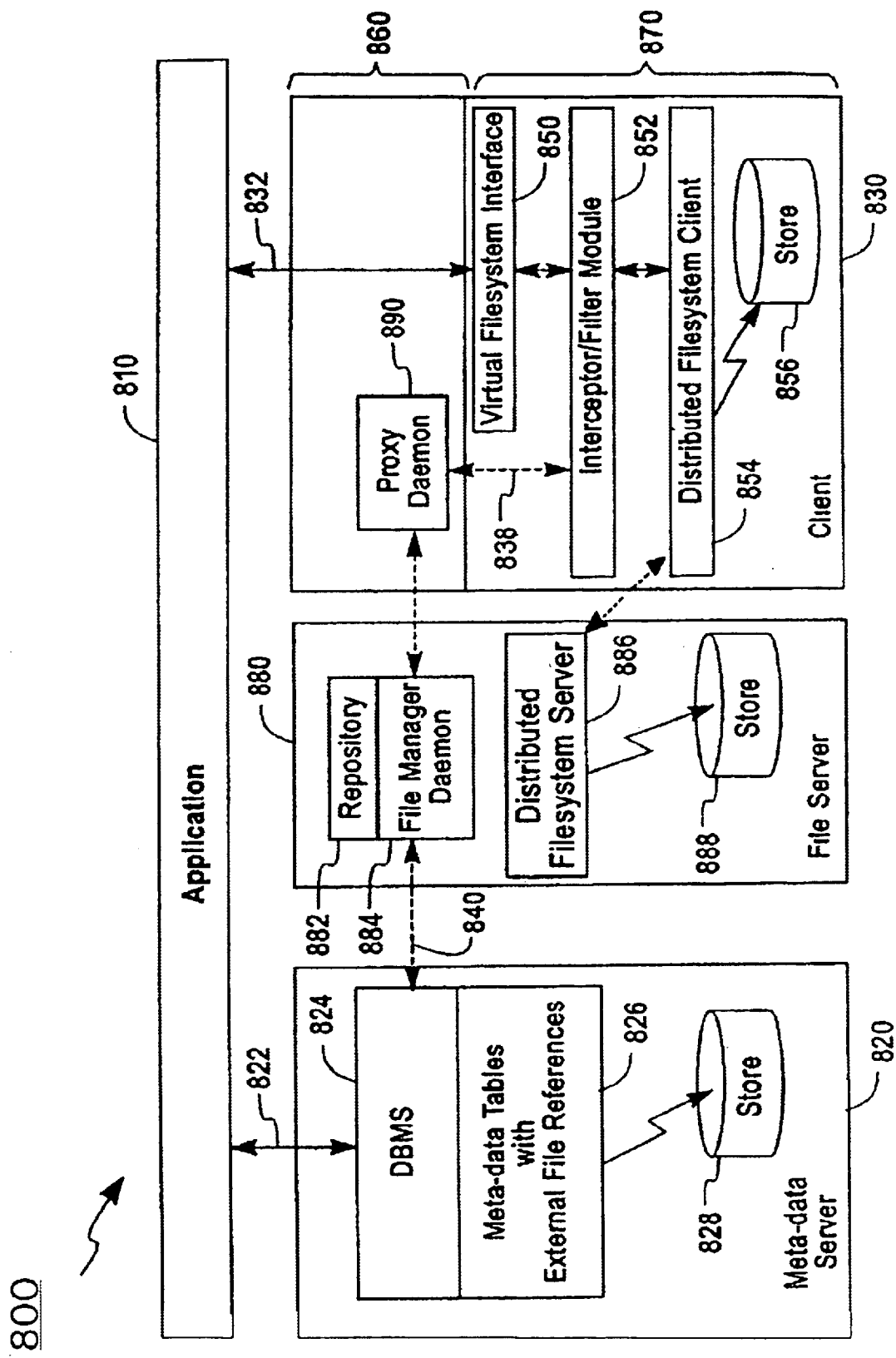
FIG. 7 is a block diagram of the system architecture for a distributed file system in accordance with a second embodiment of the invention.

FIG. 7 is a block diagram of a system 800 for maintaining the consistency of meta and file data in accordance with a second embodiment of the invention. An application 810 has a SQL path 822 for meta-data access to the meta-data server 820 and a file system API 832 for direct file access to a client 830. The system 800 also includes a file server 880 coupled between the meta-data server 820 and the client 830. The meta-data server 820 is the same as the meta-data server 720 of FIG. 6, with corresponding elements retaining similar numbers (e.g. DBMS 724 is referred to as DBMS 824 in FIG. 7). The user mode 860 of the client 830 has a proxy daemon 890. The file system API 832 is coupled between the application 810 and the virtual file system interface 850 of the kernel mode 870 of the client 830. The virtual file system interface 850 is bi-directionally coupled with the interceptor/filter module 852. An upcall path 838 is bi-directionally coupled (indicated by a dashed line) between the proxy daemon 890 of the user mode 860 and the interceptor/filter module 852. The interceptor/filter module is bi-directionally coupled with a distributed file system client 854 of the client 830. In turn, the distributed file system client 854 is coupled to the client store 856.

The file server 880 includes a local repository 882 and a file manager daemon 884. A control path 840 bi-directionally extends between the DBMS 824 of the meta-data server 820 and the file manager daemon 884 of the file server 880. Likewise, the file manager daemon 884 of the file server 880 is bi-directionally coupled with the proxy daemon 890 of the client 830. The file server 886 also includes a distributed file system server 886. The distributed file system server 886 is coupled to a file server store 888. The distributed file system server 886 of the file server 880 is bi-directionally coupled (indicated by dashed line) to the distributed file system client 854 of the client 830.

The file is updated using normal file system application program interfaces (API's) 732, 832. The file can be updated via SQL Mediated Object Manipulation (SMOM) where a handle is obtained from the mediator 724, 824, that is preferably a filename with an encrypted access token string embedded as part of the filename, and is supplied as the filename to the filesystem API. The file may be updated several times before the file's meta-data is updated in the database 728, 828. To effect the corresponding meta-data updates and relate those updates to the file updates, the user issues an SQL update through the mediator DBMS 724, 824, optionally passing in the object handle, and commits both file and meta-data updates together. Another possibility is that the file may be updated based on the filesystem permissions. To effect the corresponding meta-data updates and relate those updates to the file updates, the user issues an SQL update through the mediator DBMS 724, 824, and commits both file and meta-data updates together.

Preferably, a filter layer 752, 852 transparently intercepts native access to the external object store or file system 756, 856 and 888, making use of the embodiments of the invention, to allow or deny access to the object based on a combination of an implicit version number and the last modification timestamp for a given version. This is done to validate the consistency of the meta-data retrieved by the reader and the content of the file.

1. The Update Model

The file edits happen outside of the DB transaction. The file updates get committed to the database (DB) via the DBMS 724, 824 once the update is done. DBMS 724, 824 communicates with the file management mediator daemon (also referred to as DLFM in the Datalinks product) 736, 884 passing a version number or generation number associated with the file, which is temporally unique on every committed update to the file. The file management mediator daemon 736, 884 utilizes a local repository (i.e. local to the fileserver node) 734, 882 to store the version number attribute of the file. (The repository 734, 882 could be a local database, as is the case of the embodiment implemented as part of the DB2 Datalinks product). The file management mediator daemon 736, 884 also saves a last modification timestamp attribute of the file maintained natively by the file system (or external store) as the last modified time of the latest committed version of the file.

This file management mediator daemon 736, 884 utilizes the local repository 734, 882 (i.e. local to the fileserver node) to store the attributes of these objects at the time of their association with the DB, and at the time of committed updates. (Again, the repository could be a local database, as is the case of the embodiment implemented as part of the DB2 Datalinks product)

The solution provided by the embodiments of the invention extends the functionality of this filter layer 752, 852 and the associated file management mediator daemon 736, 840 to ensure file-data meta-data consistency. The solution returns an error for file accesses where the file content are no longer consistent with the meta-data associated with the handle being used to reference the object. Preferably, the error code is ESTALE in the Unix operating system.

2. Solution

2.1 Observation

It may be observed that the token (embedded in the handle used to reference the object) becomes obsolete in the following situations:

First if uncommitted updates are made to the file any time before the token is used OR get committed any time after the token was generated. Second if a token is issued and the database is restored to a prior time before the token is used.

These uncommitted file updates may have happened after the token is generated, or may have been pending from before the token generation. In this case, the meta-data in the table at the time the token was generated corresponds to the last committed file data and does not reflect uncommitted file updates that happened before the token was generated.

Such uncommitted file updates can happen via a re-linking of the same file (after an unlink and a change in content via a rename or a write to the file), or through an SQL Update commit for an update-in-place. There are two cases here:

1. Updates committed before the token is used; and
2. Updates not yet committed before the token is used (update-in-progress state).

This leads us to the solution provided by the embodiments of the invention.

2.2 Basic Solution for the Local File System Case

The solution provided by the embodiments of the invention is based on the following constituents:

1. A version number or generation number associated with the file, which is temporally unique on every committed update to the file:

Since updates are committed with the knowledge of the mediator DBMS in communication with its file/object management daemon component on the file server, the latest version number for the object reference associated with the meta-data store can be maintained both in the DBMS and in the local repository on the file server. Note, that such a generation number is also required for point in time recovery purposes. In the embodiments under consideration for DATALINKS, the recovery id associated with the file, which is derived from the LSN (Log Sequence Number) of the transaction in which the update was committed, may be used as version number.

2. A last modification timestamp attribute of the file maintained natively by the file system (or external store):

Whenever updates are completed, the last modification timestamp of the file at the time of update completion is noted in the local repository as the last modified time of the latest committed version of the object.

It is more efficient if the last modification timestamp is recorded when an SQL UPDATE is issued for the file, rather than at the time when the transaction is finally commits. This is possible because in this model, no further updates to the file are allowed until the transaction commits.

The approach works as follows:

1. The DBMS mediator 724, encodes the latest version number (or generation number) as part of the embedded token in the handle provided for referencing the file.
2. When the user supplies the above handle directly to the file system to open the file, the filter layer 752 which intercepts these file system operations makes an upcall 738 to the file management daemon 736 to perform the process 600 shown in FIG. 5A of checking to ensure consistency at the point of open.

Figure 5A:
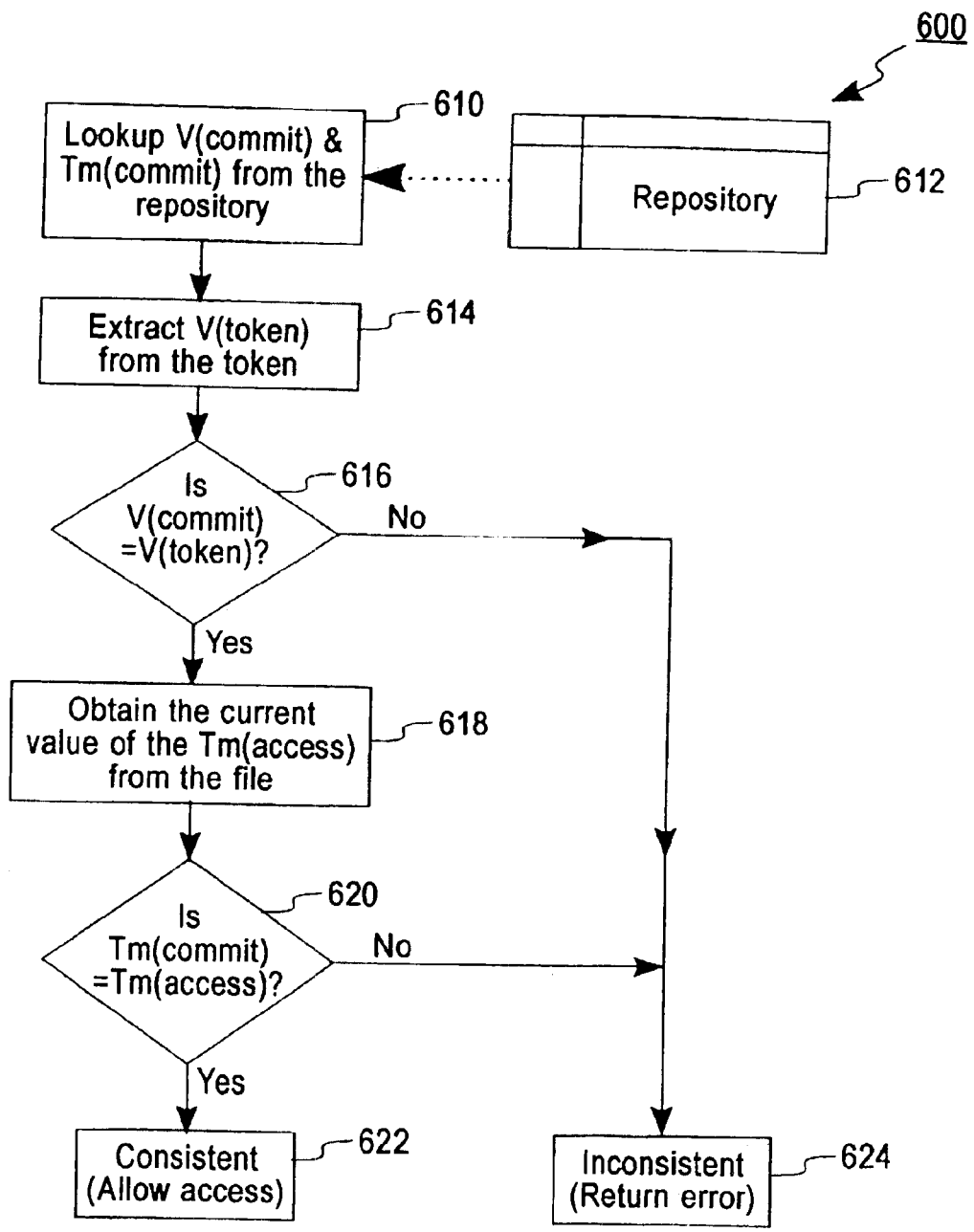
FIGS. 5A and 5B are flow charts for checking consistency in a local file system and a distributed file system, respectively.

In step 610 of FIG. 5A, the latest committed version number V(commit) of the file and the corresponding modification timestamp Tm(commit) recorded in the local repository 612 are looked up. In step 614, the version number encoded in the embedded token in the handle, V(token), is extracted. In decision block 616, a check is made to determine if V(commit) is equal to V(token). If decision block 616 returns false (NO), the token is inconsistent with the current file content and an error is returned indicating stale data. This covers the case where the reader obtained the access token/handle any time prior to the start of the update that was last committed. It also covers the situation where the reader had obtained the token and the metadata, and then in the meantime the database and the file got rolled back to an earlier state.

If decision block 616 returns true (YES), in step 618, the current value of the last modification timestamp of the file Tm(access) is obtained. Processing continues in decision block 620. In decision block 620, a check is made to determine if the modification timestamp Tm(commit) equals the timestamp Tm(access). If decision bock 620 returns true (YES), the file and meta-data are consistent and access is allowed in step 622. Otherwise, if decision block 620 returns false (NO), there are uncommitted updates to the file's content, indicating an inconsistency and an error is returned in step 624. This covers the case where an updater has modified and then closed the file after releasing any file locks, but has not updated the corresponding meta-data. Then, optionally, if the supplied handle has write-access, the repository state is checked to rule out the case where the updates have been made using the same access token. (This is to address scenario 6b in Sec 3.1 hereinafter).

3. Application level file locking must be used by readers and updaters to cover concurrent file read and updates and, in particular, to ensure that there is no open file descriptor when an updater starts updating the file.

2.2.1 Encoding the Version Number in the Token

The access token preferably contains a one-way hash value, h which is computed as follows:

$$h = \text{hash}(K, Tx, \text{file name, servername, token length, flags}),$$

where K is a secret symmetric key and Tx is the expiration time and the flags contain information about the token including which type of access is granted. Tx, token length and flags are also passed as part of the token. For cases where consistency is to be maintained between the DBMS meta-data and the object, the token can be setup to contain a version number and a different one-way hash value, H, computed as:

$$H = \text{hash}(K, Tx, \text{file name, server name, token length, flags}, Vc),$$

where Vc is the latest committed version at which the token is created and flags can contain information indicating that consistency is requested.

On the file manager side 736 for token validation, the file system filter 752 passes the token up to the file manager daemon 736. If the flags indicate that consistency is requested, the daemon 736 validates the token by calculating H where Vc is obtained from the last committed version number stored in the daemon's repository tables. The daemon 736 checks that the token has not expired and compares H with the one way hash contained within the access token.

Steps 614 and 616 in the previous section may be modified to just use the one-way hash value as the basis for checking for a version number match, instead of requiring that the version number be extracted from the token/handle. Step 614 could instead just retrieve the hash function portion of the token, H(token) and compute the one-way hash value H(commit) corresponding to V(commit), while the comparison for detecting staleness in step 616 may be replaced by "if H(token)≠H(commit)".

Figure 2A:
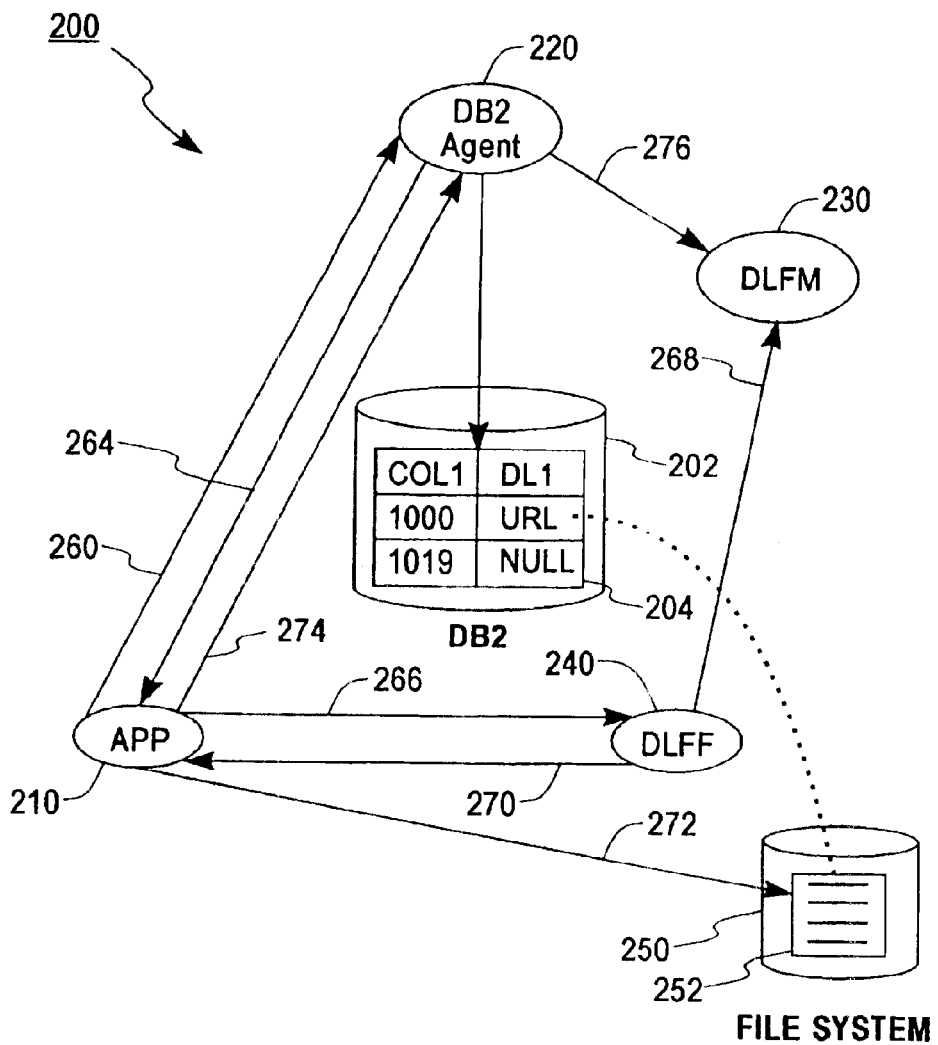
FIGS. 2A and 2B are block diagrams illustrating a content management system in accordance with an embodiment of the invention.
Figure 2B:
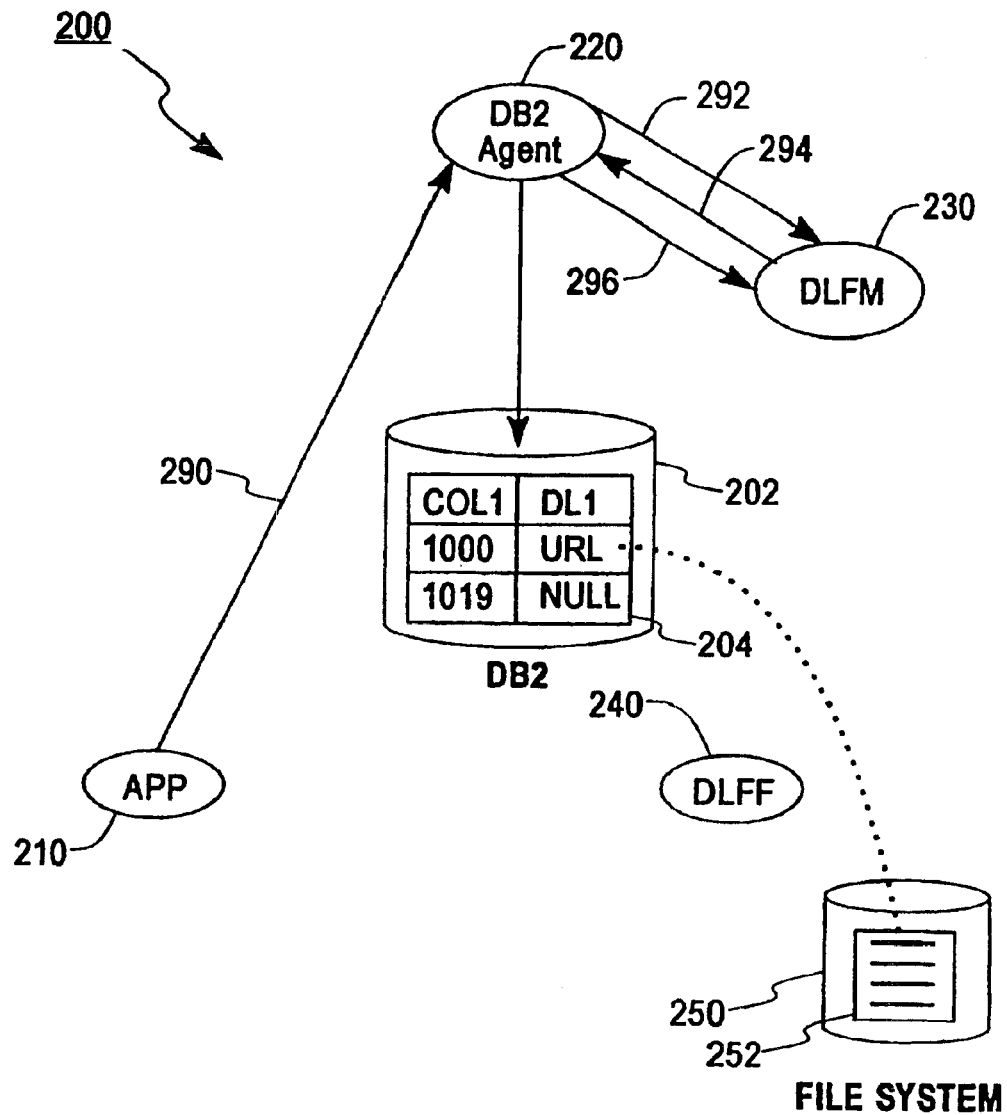

A content management system is described with reference to FIGS. 2A and 2B. In particular, FIGS. 2A and 2B are block diagrams illustrating the content management system 200. The content management system includes a database 202, preferably a DB2 UDB, and a file system 250. The database 202 contains one or more tables 204 (only one is shown to simplify the drawing). Again to simplify the drawing, the table is shown with only two rows and two columns. However, these numbers are for purposes of illustration only and differing numbers of columns and rows may be practiced. Column 1 ("COL1") contains meta-data that is searchable, and column 2 ("DL1") is the DATALINK type column enabled with options to provide in-place updating of a DATALINKed file, token-based access control on a write operation, and file data recovery.

The table 204 may contain more than one DATALINK column. The entry for the first row has "1000" in column 1 and URL' in the DATALINK column DL1. The second row has "1019" in column 1 and NULL in column DL1. As indicated by a dotted line, URL' in row 1 of the table 204 refers to file 252 in the file system 250. The file 252 is stored externally to the database 202, and the content of the file 252 may include electronic documents, text, XML and HTML, digital audio and video, scanned images, facsimiles. The foregoing are merely examples of the type of the file 252. Other file types may be practiced without departing from the scope and spirit of the invention.

The content management system 200 also includes a DB2 agent 220 coupled to the database 202, a Data Link File Manager (DLFM) 230, and a Data Link File System Filter (DLFF) 240. An application 210 is a reader in the system 200 of FIG. 2.

Figure 3A:
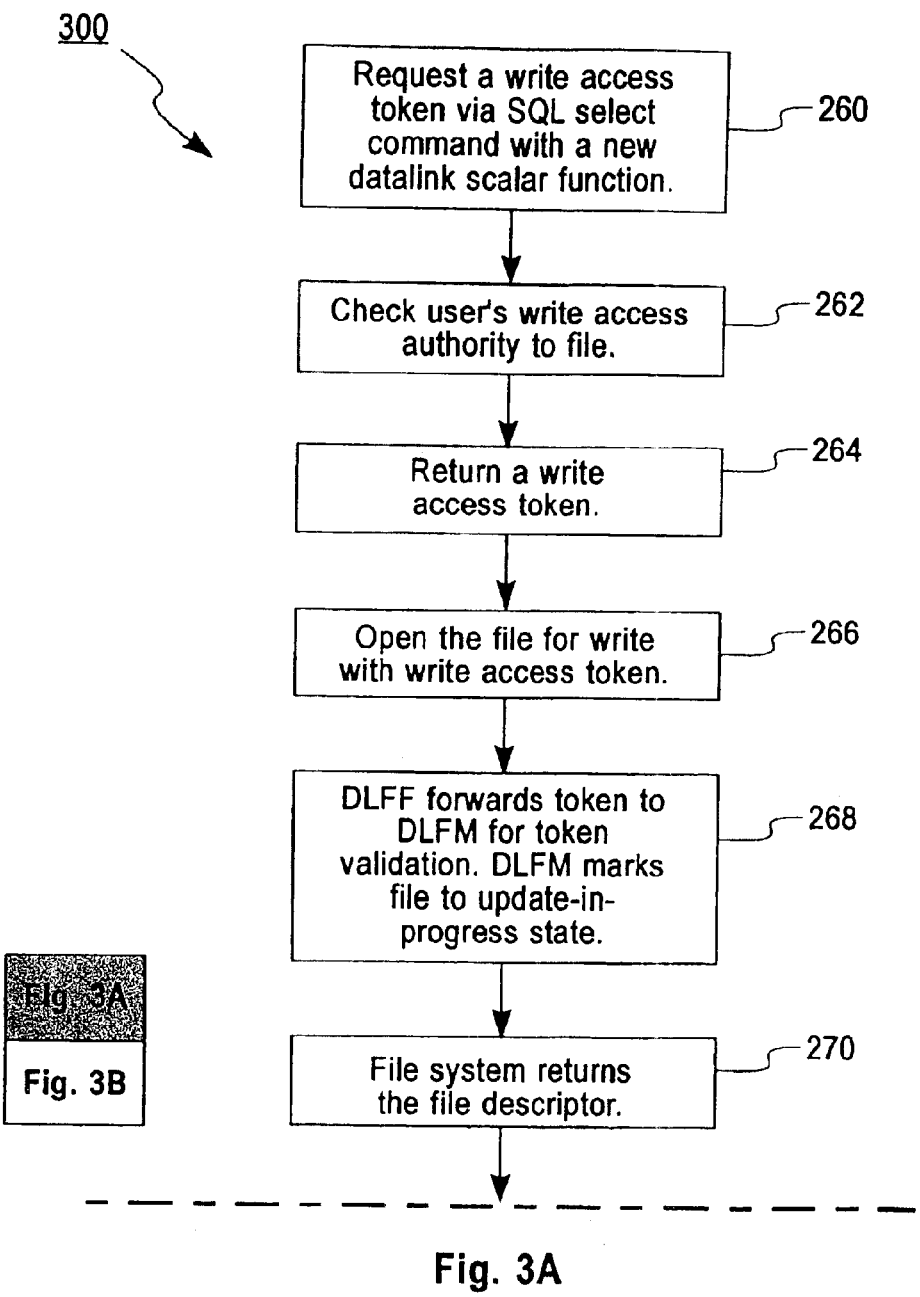
FIGS. 3A, 3B, and 3C are flow diagrams illustrating control processing of the content management system of FIG. 2.
Figure 3B:
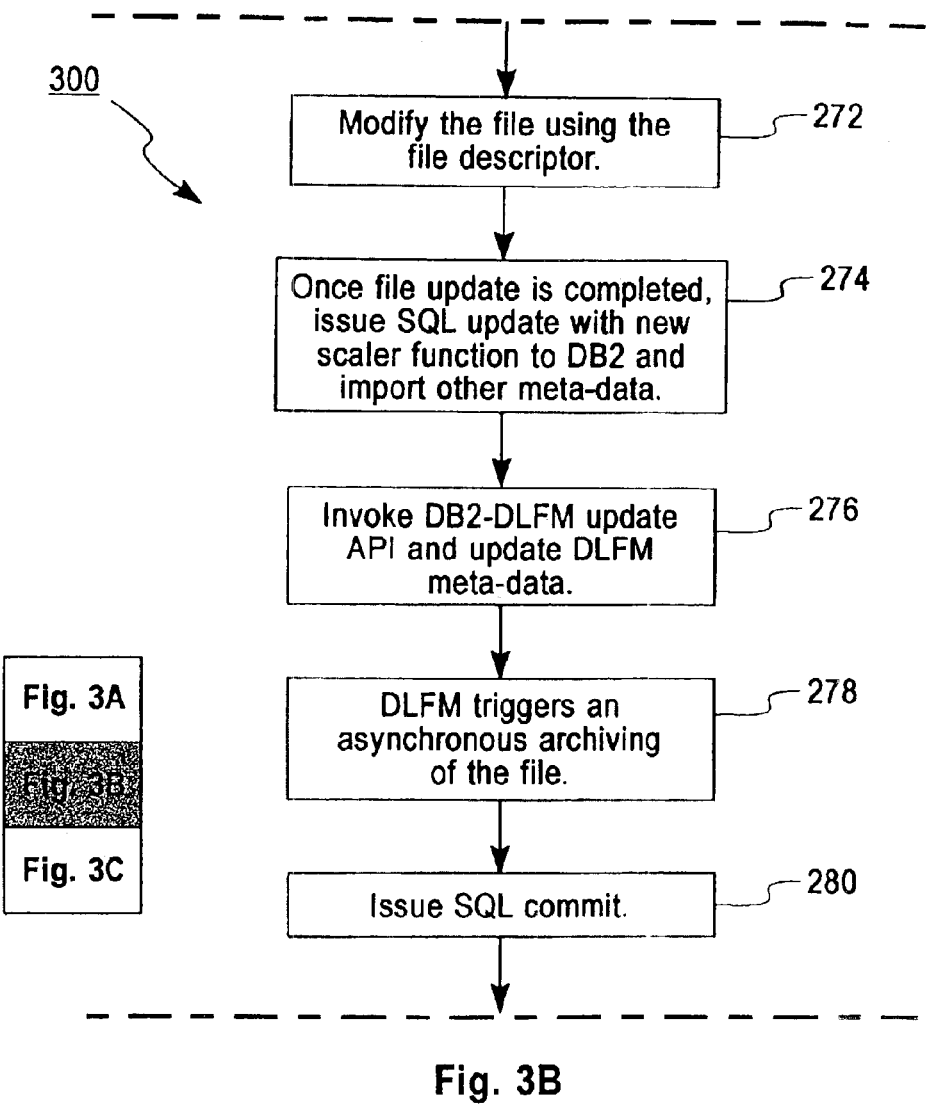
Figure 3C:
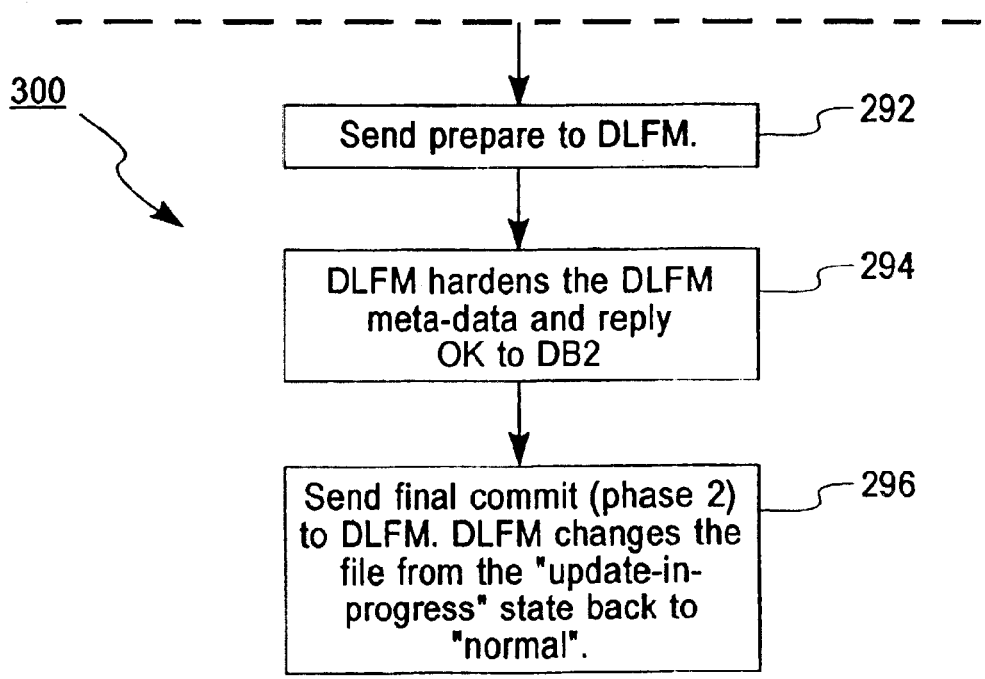
Figure 4:
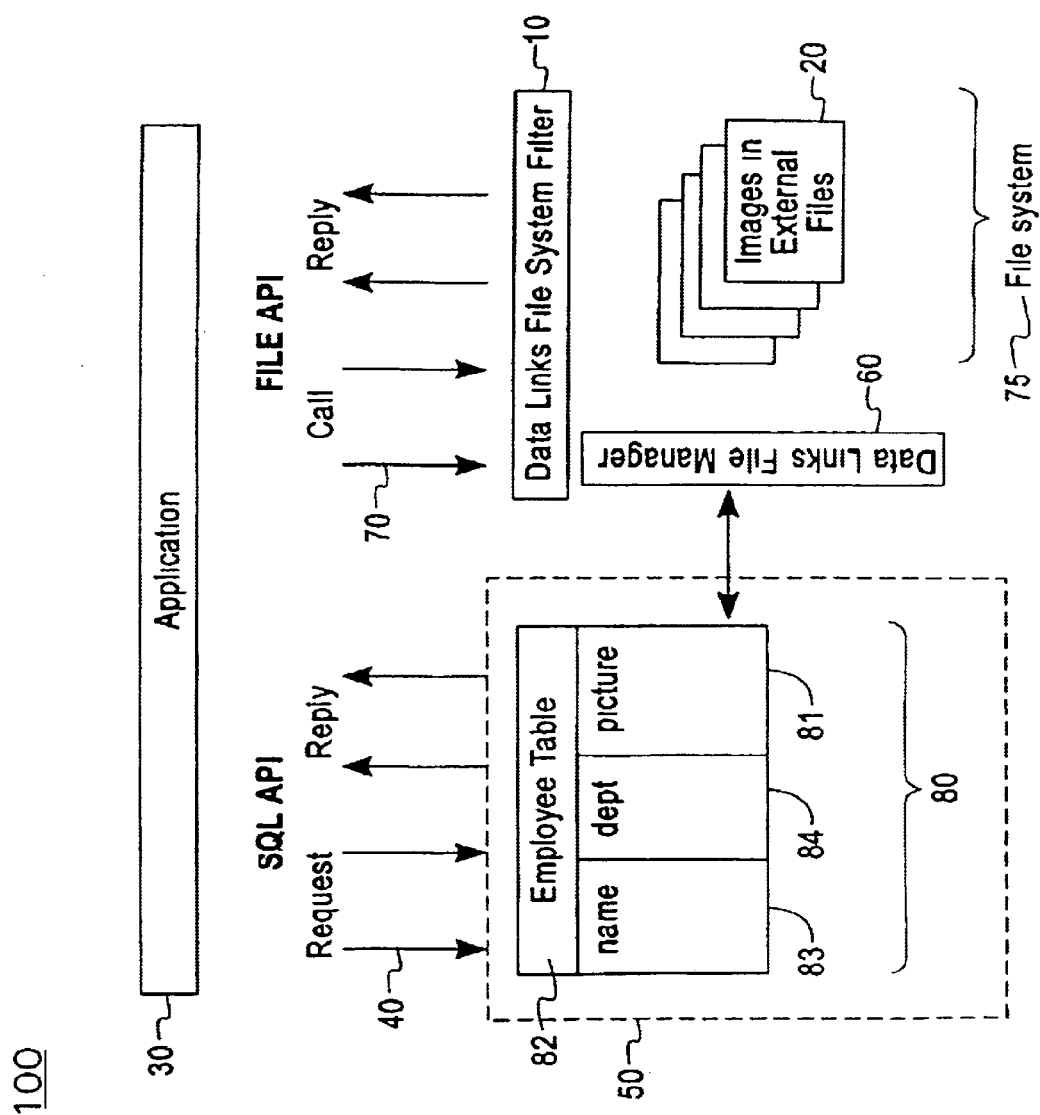

The operation of the content management system 200 is described with reference to the flow diagrams of FIGS. 3A, 3B and 3C illustrating the control process 300. The numbered arrows of FIG. 2 extending between elements shown in that drawing have counterpart steps shown in FIG. 3 to describe the operation of the system 200. The control process includes steps 260–278 and 290–296.

With reference to FIG. 2A, arrow 260 extends between application 210 and DB2 agent 220. In step 260 of FIG. 3A, the application 210 requests a write access token from the DB2 agent 220 via a SQL SELECT statement.

Arrow 264 extends from DB2 agent 220 to application 210. In step 264, a write access token is returned. The write access token includes a hash value that encodes the latest version number. Arrow 266 extends between the application 210 and DLFF 240. The application 210 opens the file for a write operation using a write access token via the DLFF 240. Arrow 268 extends from the DLFF 240 to the DLFM 230. The DLFF 240 forwards the write access token to the DLFM 230 for token validation. If the token is valid, then DLFM also checks if the file-data is consistent with the meta-data corresponding to the token. Arrow 270 extends from the DLFF module 240 to the application 210. In step 270 of FIG. 3A, the file system returns the file descriptor to the application 210.

Arrow 272 extends from the application 210 to the file 252 in the file system 250. In step 272, the application 210 modifies the file 252 using the file descriptor. Arrow 274 extends from the application 210 to the DB2 agent module 220. In step 274, once the file update is completed, the application 210 issues a SQL UPDATE to the database DB2 202 via the DB2 agent 220 and imports other meta-data into the database. Arrow 276 extends from the DB2 agent 220 to the DLFM 230 in FIG. 2A. In step 276, the DB2 agent 220 invokes a DB2-DLFM update API and update the DLFM meta-data. At this stage, the DLFM determines the last modification timestamp of the file (same as the Tm(commit)) and records that timestamp in its local repository along with the updated version number (same as the link recovery id).

With reference to FIG. 2B, an arrow 290 extends from the application 210 to the DB2 agent 220. In step 290, a SQL COMMIT is issued by the application 210 to the DB2 agent 220. An arrow 292 extends between the DB2 agent 220 and the DLFM 230. In step 292 of FIG. 3C, a PREPARE statement is sent to the DLFM 230 by the DB2 agent 220. An arrow 294 extends from the DLFM 230 to the DB2 agent 220. In step 294, the DLFM 230 hardens the DLFM meta-data and replies OK to the DB2 agent 220. Harden means guaranteeing that local repository modifications made by the DLFM for the file are remembered persistently (i.e., locally committing/hardening the information). An arrow 296 extends between the DB2 agent 220 and the DLFM 230. In step 296, a final COMMIT statement (phase 2) is sent to the DLFM 230 by the DB2 agent 220. This completes the control process.

In the case of a read operation, the flow is as follows. The application 210 requests a read access token from the DB2 agent 220 via a SQL SELECT statement. A read access token is returned. The read access token includes a hash value that encodes the latest version number. The application 210 opens the file for a read operation using a read access token via the DLFF 240. The DLFF 240 forwards the read access token to the DLFM 230 for token validation. If the token is valid, then DLFM also checks if the file-data is consistent with the meta-data corresponding to the token. This is how the DLFM performs the check. The DLFM looks up the latest committed version number V(commit) and the corresponding modification timestamp Tm(commit) in its local repository (R). Then the DLFM determines if the version number embedded in the token, i.e. V(token) matches V(commit) (preferably by computing the one-way hash value corresponding to V(commit) and comparing it with the hash value embedded in the token). In case of a mismatch, the DLFM returns an error to DLFF. Otherwise, the DLFM obtains the last modification timestamp of the file Tm(access) from the filesystem, and determines if Tm(access) is later than Tm(commit). If so, then the DLFM has detected an inconsistency and returns an error to DLFF, which reports ESTALE to the application. If not, then the DLFM returns OK and DLFF returns success. The file system returns the file descriptor to the application 210 for a successful open. The application 210 reads the file 252 using the file descriptor.

2.3 Extension to a Distributed File System Environment

A further embodiment of the invention extends the above solution to a distributed environment 800 of FIG. 7 for accesses to the file from distributed file system clients while minimizing performance overheads in communication with the central file server 880 where the file manager daemon's repository 882 is located, especially in situations where the file system client 830 is likely to service accesses from the client's cache without connecting to the server 880. The distributed file system 800 is assumed to implement its own cache coherency mechanisms.

A proxy daemon 890 may be set up at each client 830 to service upcalls 838 from the filter module 852, which intercepts file accesses on the client 830. This proxy daemon 890 contacts the central server 880/repository 882 when required. As described hereinbefore, the requirement is to minimize these contacts, especially for read performance in the most typical cases (i.e. repeated accesses to the same file should be servicable from the cache without contacting the server as far as possible).

First Time Access

The first time a file is accessed with a token at the client, the client proxy daemon 890 contacts the remote central repository 882 and makes an entry in a local (possibly in-memory) table with:

- the latest committed version number, V(commit) of the file,
- the value of the corresponding file identifier, Fid(commit) of the latest version of the file, and
- the modification timestamp of the file when updates to it were last committed, Tm(commit).

The check for stale data is:

$$is\_stale = (V(\text{token}) \neq V(\text{commit})) \,\text{OR}\, (Tm(\text{access}) \neq Tm(\text{commit})).$$

Cached Case (Repeated Accesses):

The next time the same file is accessed (either with the same or a different token), the proxy daemon 890 can simply look up the proxy daemon's local table entry and if Fid(access)=Fid(commit), then the proxy daemon 890 can use the in-memory entry to perform the above check.

If is_stale is FALSE, access can continue without a need to contact the server 880.

Otherwise, the proxy daemon 890 needs to refresh the entry from remote central repository 882 and perform the check again.

Fid(commit) and Fid(access) refer to the file-id value at the time of commit and time of access respectively, i.e. Fid(commit)=value of Fid (Filename, Tm(commit)) where Fid(f,t)=value of unique file id of the file named "f" at time "t".

The reason for explicitly introducing these in the distributed case, is to correctly handle cases where the file may have been unlinked, renamed and relinked under the same name (as in Scenario 2). By indexing V(commit) and Tm(commit) against Fid(commit) in the local in-memory table, and looking up the cached entry against Fid(access). This ensures that the version number and Tm values refer to the same file, so that a comparison with Tm(access) makes sense. This is important in the distributed case, because the cached value of V may be stale, making Tm(access) the real determinant of whether the entry should be considered stale or not.

The unique file id maintained by a distributed filesystem usually includes some kind of per inode generation number of its own to account for reuse of inode numbers after files are deleted. This inode generation number is typically incremented every time an inode number is reassigned to a newly created file. This ensures the temporal uniqueness of a file identifier.

Just as in the local case, if Tm(access)>Tm(commit) and the token is a write token, an optional step of checking the file if an update-in-progress with the same token/user may be involved (e.g. by checking state information in the repository).

This approach causes the client to contact the central repository on the server only if the file changed or got relinked since the last time the entry was looked up. The in-memory table entries can be flushed/reused based on the expiration time and resource limits.

Figure 5B:
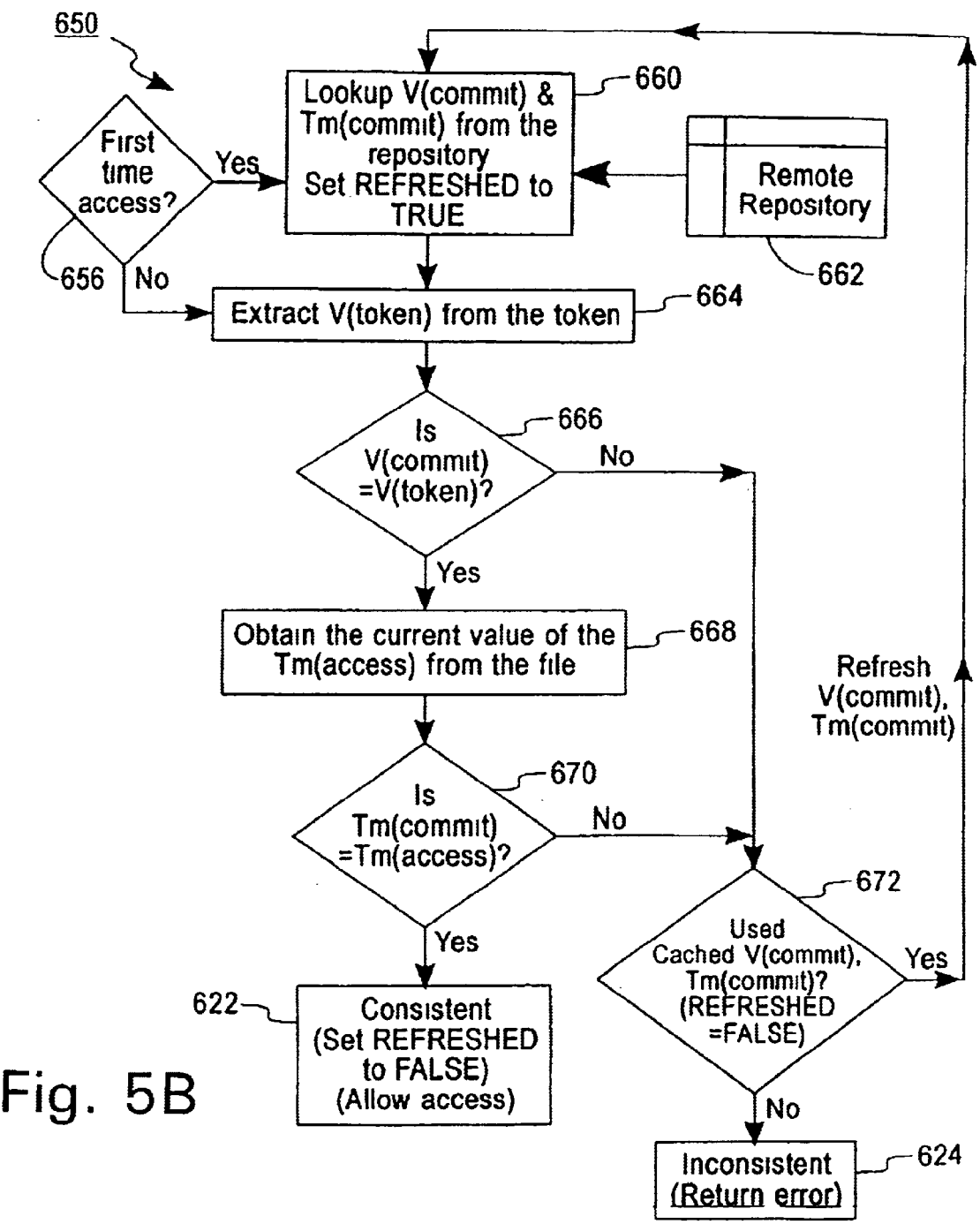

FIG. 5B is a flow diagram illustrating the process of checking consistency of meta-data and file data in a distributed file system in accordance with the second embodiment. In step 656, a check is made to determine if the present case represents a "first time" access of the file. If a first time access is being made, processing starts at step 660. Otherwise, step 660 is skipped and processing starts at step 664. In step 660, the last committed version number, V(commit) and the timestamp Tm(commit) are looked up from the repository (i.e., remote repository 662 corresponding to repository 882 in FIG. 7) and the variable REFRESHED is set to true. When step 660 is skipped, cached values of V(commit) and Tm(commit) for the file are used instead in the subsequent steps. Processing continues at step 664, in which the version number V(token) is extracted from the token. In step 666, a check is made to determine if V(commit) is equal to V(token). If decision block 666 returns false (NO), processing continues at decision block 672. Otherwise, if decision block 666 returns true (YES), processing continues at step 668.

In step 668, the current value of the timestamp Tm(access) is obtained from the file. In decision block 670, a check is made to determine if the timestamp Tm(commit) is equal to Tm(access). If decision block 670 returns false (NO), processing continues at decision block 672. If decision block 670 returns true (YES), the file and meta-data are consistent, the variable refreshed is set to false, and access is allowed to the object in step 622.

In decision block 672, a check is made to determine if the cache was accessed (i.e. REFRESHED equals false). If decision block 672 returns true (YES), processing continues at block 660. Finally, if decision block 672 returns false (NO), the meta-data and file data are inconsistent and an error is returned in step 624.

3. Scenarios Analyzed

This section discusses various key scenarios and how the embodiments handle each of these situations to prevent potential inconsistencies from arising.

Initial Assumption:

It is sufficient to guarantee the consistency at the point of the file/object open. The user is expected to use some form of file/application-level locking as in a normal file system to ensure serialization between concurrent readers and updaters. Specifically, an updater must not start its updates if there is any reader that has opened the file. Otherwise, the reader could see inconsistent data. Table 1 is a legend of terminology used hereinafter.

TABLE 1

| Term | Meaning |
|---|---|
| Qr(f, t) | user does a SQL query and an access token for a file f is assigned at time t. |
| Qw(f, t) | user does the SQL query for a write token and the write token for the file f is assigned at time t. |
| C(f, t) | Content of the file f at time t. |
| Rs(f, t) | time when the reader opens the file f with access token for generated at t. |
| Re(f, t) | time when the reader closes the file f (finished reading the file) corresponding to Rs(f, t). |
| Us(f, t) | time when the writer opens the file f for update using the write token generated at t. |
| Ue(f, t) | time when the writer closes the file f (i.e. finishes writing the file) corresponding to Us(f, t), but not yet committed to the database (DB) using SQL update. |
| Uc(f, t) | time when meta-data in DB is updated and committed together with the file-data updates for the file f. |
| I(f) | time when the file f is linked (inserted into) to the database. |
| D(f) | time when the file f is unlinked (deleted) from the database (restore on unlink). |
| Us(f) | time when the writer opens the file for an update without a token. |
| Ue(f) | time when the writer closes the file (finishes writing the file) corresponding to Us(f). |
| M(f', f) | time when the file f' is moved to f (could be rm f, mv f' f) results in f getting replaced by f' – both data + attributes (including timestamp) C(f, ta) <= C(f', tb), where ta < M(f', f) < tb. |

3.1 Addressing Potential Inconsistency Scenarios

The application is responsible for ensuring serialization, so that Rs-Re essentially happens under a shared file lock and Us-Ue happens under an exclusive file lock. However, multiple Us-Ue iterations can happen before Uc to finally commit the update, and an Rs-Re can happen between two such Us-Ue sequences.

1. Query—Unlink—Update—Relink—Access

A file is unlinked and linked back again after modifying the content of the file (not in-place update). The file is then accessed using a token generated prior to the unlink.

I1(f); Qr(f,t); D1(f); $U_s(f)$; $U_e(f)$; I2(f); Rs(f,t)

File data consistent with Qr(f,t) is C(f,I1(f)) or C(f,t). C(f, Rs(f,t)) differs from C(f, t) since the file has been written to in between.

With the embodiments of the invention, Rs (f,t) fails since V(token)<V(commit), i.e., the version-id embedded in the read-token is earlier than the one in I2(f). If I2(f) had not happened, Rs(f,t) fails since the file owner is not DB and the read token is embedded in the file pathname.

2. Query—Unlink—MoveTo—Relink—Access

The file is unlinked and linked back again after renaming another file to this file name. The file is then accessed using a token generated prior to the unlink (that token was meant to represent the original file, not the just renamed one).

I1(f); Qr(f,t); D1(f); M(f',f); I2(f); Rs(f,t)

File data consistent with Qr(f,t) is C(f, I1(f)) or C(f,t). C(f,Rs(f,t))=C(f,t<M(f',f), which differs from C(f,t). The file has changed to a different one in between.

As in scenario (1) above, with the embodiments of the invention, Rs(f,t) fails since V(token)<V(commit), i.e., the version-id embedded in the read-token is earlier than the one in I2(f). In the distributed file system case, where the client's in memory table has a stale value of V(commit) and Tm(commit), the condition [Tm(access) for f'>Tm(commit) for f] may not suffice to detect stale information. However, the check Fid(access)=Fid(commit) fails, and a refresh of the values of V(commit) and Tm(commit) from the server is triggered.

3. Query—Get write token—Update file in—place—SQL update commit—Access

File is updated in place (the complete SMOM sequence) and committed. The file is then accessed using a token generated prior to starting the update.

I(f); Qr(f,t1); Qw(f,t2); Us(f,t2); Ue(f,t2); Uc(f,t2); Rs(f,t1)

The file data consistent with Qr(f,t1) is C(f,I(f)) or C(f,t1). C(f,Rs(f,t1)) differs from C(f,t1) as the file content has been updated.

With the embodiments of the invention, Rs (f,t1) fails since V(token)<V(commit).

4. Update-file in place—Query—SQL Update commit—Access

The file is updated in place and committed. The file is then accessed using a token generated after the file modifications were completed, but before the SQL Update was issued to complete the corresponding meta-data updates.

I(f); Qw(f,t1); Us(f,t1); Ue(f,t2); Qr(f,t2); Uc(f,t1); Rs(f,t2)

The file data consistent with Qr(f,t2) is C(f,I(f)) or C(f,t1), but not C(f,t2) since the meta-data has not changed yet at t2 but only after that. C(f,Rs(f,t2)) differs from C(f, t1) as the file content has been updated between t1 and t2.

With the embodiments of the invention, Rs(f,t2) fails since V(token)<V(commit).

Another case that can be considered equivalent to the above for current purposes is:

I(f); Qw(f,t1); Us(f,t1); Qr(f,t2); Ue(f,t2); Uc(f,t1); Rs(f,t2).

With the embodiments of the invention, Rs(f,t2) fails since V(token)<V(commit).

5. Get Write tokens 1 and 2—Update-file in place with token 1—SQL Update Commit—Access with token 2

The file is updated in place and committed using one write token. The file is then accessed with another write token, which is generated prior to the update.

I(f); Qw(f,t1); Qw(f,t2); Us(f,t1); Ue(f,t1); Uc(f,t1); Rs(f,t2) or Us(f,t2)

File data consistent with Qw(f,t2) is C(f,I(f)) or C(f,t2) C(f,Rs(f,t2)) differs from C(f, t2) since the file content has been updated. This is similar to above scenario 3, but that this happens with a write token instead of a read token.

With the embodiments of the invention, Rs (f,t2) fails since V(token)<V(commit).

6. (a) Get Write tokens 1 and read/write token 2—Update-file in place with token 1 —Access with token 2—SQL Update Commit The file is updated in place using one write token, but not yet committed. The file is then accessed with another write token, which is generated prior to the update.

I(f); Qw(f,t1); Qr(f,t2)/Qw(f,t2); Us(f,t1); Ue(f,t1); Rs(f,t2)/Us(f, t2); Uc(f, t1);

File data consistent with Qr(f,t2)/Qw(f,t2) is C(f,I(f)) or C(f,t2). C(f,Rs(f,t2)) differs from C(f,t2) since the file content has been updated (by the same user, though).

With the embodiments of the invention, Rs(f,t2) fails since Tm(access)>Tm(commit). However, for the same user-id, it may make sense for the read to be allowed and the updates to be visible to the reader. This is accomplished by changing the ownership of the file to the updater's userid for the duration of the file update until commit. This makes it possible to perform the above timestamp check only if the reader is not the same userid as the current updater.

A need exists to be able to differentiate the above from the following situation, which is not considered as an inconsistency:

(b) Get Write token—Update-file in place with token—Access again with token—SQL Update Commit The file is updated in place using a write token and then accessed again with the same write token without committing.

I(f); Qw(f,t1); Us(f,t1); Ue(f,t1); Rs(f,t1)/Us(f,t1); Uc(f,t1);

As the same token that is used for the first update is used again, more appropriately the token returns the latest state of the file data as written using earlier with this token.

Two options are available to handle the case of a second write-token for the same user. Firstly, write access can be denied to even the same user with different token (than what is already tracked). Secondly liberally allow update based on the same user-id. If uncommitted updates are decided to be made and alternatively, visible and modifiable on accesses by the same user, this situation is taken care of using a similar logic as described under the previous point. If the other option is decided upon, since the write-token is tracked until the update is committed, when a different token is used can be detected. In the distributed file system extension, this check happens at the end after all other conditions are covered, as interaction with the file server is required.

There is an implicit assumption here that other users are not allowed to use the write-token as long as an update is in progress.

7. Get write token 1—Update file in place—Get read token 2—DB rollback to earlier version—Access with read token 2

A database rollback to an earlier version happens, and the file is accessed with a token that was generated prior to the rollback (and hence corresponding to a later version, which is no longer valid after the rollback)

I(f);Qw(f,t1);Us(f,t1); Ue(f,t1); Uc(f,t1); Qr(f,t2); RB(f,t1); Rs(f, t2)

File data consistent with Qr(f,t2) is C(f,t2) i.e. C(f,Uc(f,t1)), while after the rollback, file content is C(f,t1) which is the same as C(f,I(f))

With the solution proposed, Rs(f,t2) fails since in this case V(token)>V(commit), i.e. the version-id embedded in the read-token is different from the one in I(f).

In the distributed filesystem case, where the client's in memory table has a stale value of V(commit) and Tm(commit), the condition V(token)=V(commit) could succeed and thus may not suffice to detect stale information (since the client may have cached the version id corresponding to t2, i.e. Uc(f t1) and not yet be aware of the rollback to t1). However in that situation, the check Tm(access)=Tm (commit) would fail (because the cached value of Tm(commit) is still t2 so far, while the rollback would have reverted the file's actual modification timestamp back to t1), and trigger a refresh of the values of V(commit) and Tm(commit) from the server.

As the foregoing embodiments of the invention illustrate, a loose transaction model for updates to a file and its corresponding meta-data through a mediator is useful for directly performing in-place edits of content data residing on stores external to the indexed meta-data store (the latter could be a DBMS). This is subject to the requirement of ensuring consistency between the file content and the associated meta-data from a reader's perspective. The embodiments of the invention encode a version number in the handle for referencing the object associated with a given meta-data state. A thin interceptor layer on the native store, where the objects content are stored, decodes this version number and compares the decoded version number with the version number of the latest committed version of the file. This is done to determine if the handle refers to the current version. If the version matches, the thin interceptor layer checks for uncommitted updates by comparing the last modification time stamp of the file with the last modification timestamp for the latest committed version. If these match, the thin interceptor layer allows access to proceed as usual for the file. Otherwise, the thin interceptor layer reports an error indicating that the handle refers to stale data.

The embodiments of the invention are advantageous in a number of ways. The embodiments enable in-place updates of file content to be made directly on the file system, which is separate from the meta-data store. This is done while ensuring that a reader application does not see an inconsistency between the meta-data and the file data. Another advantage is that the consistency check on file access can be performed without contacting the meta-data server, which is separate from the meta-data store. This results in fast content access times even when the file and meta-data servers are distributed.

Advantageously, this approach is suitable for a distributed model for file and meta-data storage, since the file content access path checks do not require any direct communication with the meta-data server. This approach extends easily to a configuration where the external store is a distributed file system and the content is accessed directly from distributed file system clients. This works even in the presence of authoritative caching (as in DCE-DFS) with minimal communication overheads and does so using an entirely client initiated approach, without any client specific state being required to be maintained on the servers. The approach may be enhanced to work correctly (in terms of preventing accesses to potentially inconsistent data) with mobile file systems (e.g., Coda or Intermezzo) that operate in disconnected mode. The consistency check makes efficient use of caching for improved performance without losing correctness.

Further, the method described does not require clock synchronization between the database server and the filesystem server, and even with the filesystem client in the distributed filesystem case. Note that even in the scenario where the clocks are synchronized, it is not efficient for the DB server to save the time when the latest update was committed, T1(Commit) (instead of V(commit)), and provide it to the mediator daemon at transaction commit to save the same (T1(commit) value) for the corresponding files in the local repository on the file server. The reason is that this would require the database server to track all the rows involved in the linkfile operation for a particular transaction, update them prior to doing its commit processing with the T(Commit) value, and the same would have to be done at the file management daemon's end.

The solution is capable of covering cases where the database has been rolled back to an earlier state, as might happen in the case of a point-in-time restore, and should also work with database replication, as long as the legitimacy of the last modified timestamp of the file is maintained during a restore and across replicas.

The embodiments of the invention are preferably implemented using one or more general-purpose computers. In particular, the processing or functionality of FIGS. 2–3 and 5–7 can be implemented as software, or a computer program, executing on the computer(s). The method or process steps for maintaining (or ensuring) meta-data and file-data consistency in a loose transaction model of file and meta-data updates, especially for use with an application or reader, are effected by instructions in the software. The software may be implemented as one or more modules for implementing the process steps. A module is a part of a computer program that usually performs a particular function or related functions. Also, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects advantageous apparatuses for maintaining (or ensuring) meta-data and file-data consistency in a loose transaction model of file and meta-data updates.

Preferably, a computer system includes a computer, a video display, and input devices. In addition, the computer system can have any of a number of other output devices including line printers, laser printers, plotters, and other reproduction devices connected to the computer. The computer system can be connected to one or more other computers via a communication interface using an appropriate communication channel such as a modem communications path, a computer network, or the like. The computer network 820 may include a local area network (LAN), a wide area network (WAN), an Intranet, and/or the Internet.

The computer itself consists of a central processing unit(s) (simply referred to as a processor hereinafter), a memory which may include random access memory (RAM) and read-only memory (ROM), input/output (IO) interfaces, a video interface, and one or more storage devices. The storage device(s) can consist of one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus that in turn can consist of data, address, and control buses.

The foregoing system is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing are merely examples of the types of computers with which the embodiments of the invention may be practiced. Typically, the processes of the embodiments, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely examples of relevant computer readable mediums. Other computer readable mediums may be practiced without departing from the scope and spirit of the invention.

In the foregoing manner, a method, an apparatus, a computer program, a computer program product, and a system for maintaining (or ensuring) meta-data and file-data consistency in a loose transaction model of file and meta-data updates are disclosed. While only a small number of embodiments are described, it will be apparent to those skilled in the art in view of this disclosure that numerous changes and/or modifications can be made without departing from the scope and spirit of the invention.

We claim:

1. A method of maintaining consistency of content of an object and metadata, said method including the steps of:

storing said related metadata and a reference to said object in a table of a database, said object being stored externally to said database in an object store, said object capable of being edited independently of said related metadata, said reference used to obtain a handle for directly accessing or manipulating said external object;

obtaining a version number embedded in an access token in said handle;

comparing said embedded version number with a version number of a latest committed version of said externally stored object to determine if said handle refers to a current version of said externally stored object;

permitting direct access to said externally stored object if said handle refers to a current version of said externally stored object;

updating said externally stored object while said object is accessed without modifying said metadata in said database; and allowing access to said metadata in said database while said externally stored object is being uodated.

2. The method according to claim 1, further including the steps of:

if said encoded version number and said version number of said latest committed version match, comparing a last modification time stamp of said object with a last modification timestamp for said latest committed version of said object; and if said last modification time stamp of said object matches with said last modification timestamp for said latest committed version of said object, permitting access to said externally stored object.

3. The method according to claim 2, further including the step of, if said last modification time stamp of said object does not match with said last modification timestamp for said latest committed version of said object, generating an error to indicate that said handle refers to stale content in said object.

4. The method according to claim 2, wherein said object store is a distributed file system, said object being accessed from a remote file system client.

5. The method according to claim 4, wherein a file access occurs in the presence of authoritative caching and said comparing steps are performed at said file system client.

6. The method according to claim 5, further including the steps of caching the last known version number and the corresponding last modification timestamp at said file system client after an access and refreshing said last known version number and said corresponding last modification timestamp with latest values from a file server the next time one or both of said comparisons fail with the previously cached values, in which case said comparing steps are retried with refreshed values.

7. The method according to claim 6, wherein the last-modification-timestamp attribute associated with said object is maintained by said object store.

8. The method according to claim 1, further including the steps of updating said object in-place under either DBMS control or file system control and linking said metadata and said object under DBMS control.

9. The method according to claim 8, wherein said object is capable of being edited independently of said related metadata and uses SQL Mediated Object Manipulation (SMOM) for an object that resides external to said database.

10. The method according to claim 1, further including the step of intercepting a native access to said externally stored object or a file system and validating the caller's access rights based on a combination of said version number and a last modification timestamp for a version of said object.

11. The method according to claim 10, wherein said intercepting step is carried out using a filter layer of said object store for said stored object.

12. The method according to claim 1, wherein said object store is a local file system.

13. The method according to claim 1, wherein said version number is temporally unique.

14. The method according to claim 1, wherein clock synchronization between a database server and a filesystem server is not required.

15. The method according to claim 1, wherein said database is rolled back to an earlier state.

16. The method according to claim 1, wherein said database is a replicated version.

17. An apparatus for maintaining consistency of content of an object and metadata related to said object, said apparatus including:

means for storing said related metadata in a table of a database, said object being stored externally to said database in an object store, and said object capable of being edited independent of said metadata, said reference used to obtain a handle for directly accessing or manipulating said external object;

means for obtaining a version number embedded in an access token in said handle; and means for comparing said embedded version number with a version number of a latest committed version of said externally stored object to determine if said handle refers to a current version of said externally stored object;

means for, if said embedded version number of said object matches with said version number of a latest committed version of of said object, permitting access to said externally stared object;

means for updating said object while said object is accessed without modifying said metadata in said in said database; and means for accessing said metadata for said object while said object is being updated.

18. The apparatus according to claim 17, further including:

means for, if said encoded version number and said version number of said latest committed version match, comparing a last modification time stamp of said object with a last modification timestamp for said latest committed version of said object; and means for, if said last modification time stamp of said object matches with said last modification timestamp for said latest committed version of said object, permitting access to said externally stored object.

19. The apparatus according to claim 18, further including means for, if said last modification time stamp of said object does not match with said last modification timestamp for said latest committed version of said object, generating an error to indicate that said handle refers to stale content in said object.

20. The apparatus according to claim 18, wherein said object store is a distributed file system, said object being accessed from a remote file system client.

21. The apparatus according to claim 20, wherein a file access occurs in the presence of authoritative caching and both said means for comparing are implemented at said file system client.

22. The apparatus according to claim 21, further including means for caching the last known version number and the corresponding last modification timestamp at said file system client after an access and means for refreshing said last known version number and said corresponding last modification timestamp with latest values from a file server the next time with previously cached values, in which case both comparing means retry said comparisons with refreshed values.

23. The apparatus according to claim 17, further including means for updating said object in-place under either DBMS control or file system control and linking metadata and said object under DBMS control.

24. The apparatus according to claim 23, wherein said loose-transaction update model uses SQL Mediated Object Manipulation (SMOM) for an object that resides external to said database.

25. The apparatus according to claim 17, further including means for intercepting a native access to said externally stored object or a file system and validating the caller's access rights based on a combination of said version number and a last modification timestamp for a version of said object.

26. The apparatus according to claim 25, wherein said intercepting means uses a filter layer of said object store for said stored object.

27. The apparatus according to claim 17, wherein said object store is a local file system.

28. The apparatus according to claim 17, wherein said version number is temporally unique.

29. The apparatus according to claim 28, wherein a last-modification-timestamp attribute is associated with said object and maintained by said object store.

30. The apparatus according to claim 17, wherein clock synchronization between a database server and a filesystem server is not required.

31. The apparatus according to claim 17, wherein said database is rolled back to an earlier state.

32. The apparatus according to claim 17, wherein said database is a replicated version.

33. A computer program for maintaining consistency of content of an object and metadata related to said object, said computer program including:

computer code for storing said related metadata and a reference to said object in a table of a database, said object being stored externally to said database in an object store, and said object capable of being edited independently of said related metadata, said reference used to obtain a handle for directly accessing or manipulating said external object;

computer code for obtaining a version number embedded in an access token in said handle;

computer code for comparing said embedded version number with a version number of a latest committed version of said externally stored object to determine if said handle refers to a current version of said externally stored object;

computer code for, if said embedded version number of said object matches with said version number of said latest committed version of said object, permitting access to said externally stored object;

computer code to update said object while said object is accessed without modifying said related metadata in said database; and computer code to access said related metadata in said database while said object is being updated.

34. The computer program according to claim 33, further including:

computer code for, if said encoded version number and said version number of said latest committed version match, comparing a last modification time stamp of said object with a last modification timestamp for said latest committed version of said object; and computer code for, if said last modification time stamp of said object matches with said last modification timestamp for said latest committed version of said object, permitting access to said externally stored object.

35. The computer program according to claim 34, further including computer code for, if said last modification time stamp of said object does not match with said last modification timestamp for said latest committed version of said object, generating an error to indicate that said handle refers to stale content in said object.

36. The computer program according to claim 33, further including computer code for updating said object in-place under either DBMS control or file system control and linking said metadata and said object under DBMS control.

37. The computer program according to claim 36, wherein said loose-transaction update model uses SQL Mediated Object Manipulation (SMOM) for an object that resides external to said database.

38. The computer program according to claim 33, further including computer code for intercepting a native access to said externally stored object or a file system and validating the caller's access rights based on a combination of said version number and a last modification timestamp for a version of said object.

39. The computer program according to claim 38, wherein said intercepting computer code uses a filter layer of said object store for said stored object.

40. The computer program according to claim 33, wherein said object store is a local file system.

41. The computer program according to claim 40, wherein a file access occurs in the presence of authoritative caching and both said computer codes for comparing are carried out at said file system client.

42. The computer program according to claim 33, wherein said object store is a distributed file system, said object being accessed from a remote file system client.

43. The computer program according to claim 33, wherein said version number is temporally unique.

44. The computer program according to claim 33, wherein a last-modification-timestamp attribute is associated with said object and maintained by said object store.

45. The computer program according to claim 33, wherein clock synchronization between a database server and a filesystem server is not required.

46. The computer program according to claim 33, wherein said database is rolled back to an earlier state.

47. The computer program according to claim 33, wherein said database is a replicated version.

* * * * *